May 29, 1962 P. J. HERBST 3,037,190

INFORMATION TRANSMISSION SYSTEM

Filed July 20, 1956 3 Sheets-Sheet 1

INVENTOR.
PHILIP J. HERBST
BY Morris Rabkin
ATTORNEY

May 29, 1962 P. J. HERBST 3,037,190

INFORMATION TRANSMISSION SYSTEM

Filed July 20, 1956 3 Sheets-Sheet 2

INVENTOR.
PHILIP J. HERBST

BY Morris A. Rabkin

ATTORNEY

| | | 1ST HARMONIC WAVE | | | | 2ND HARMONIC WAVE | | | | 3RD HARMONIC WAVE | | | |
|---|---|---|---|---|---|---|---|---|---|---|---|---|---|
| | | 0 PHASE SHIFT $K\,SIN(2\omega_0 t+0)$ | | $\pi/2$ PHASE SHIFT $K\,SIN(2\omega_0 t+\pi/2)$ | | 0 PHASE SHIFT $K\,SIN(3\omega_0 t+0)$ | | $\pi/2$ PHASE SHIFT $K\,SIN(3\omega_0 t+\pi/2)$ | | 0 PHASE SHIFT $K\,SIN(4\omega_0 t+0)$ | | $\pi/2$ PHASE SHIFT $K\,SIN(4\omega_0 t+\pi/2)$ | |
| | | AMP. | SLOPE | AMP. | SLOPE | AMP. | SLOPE | AMP. | SLOPE | AMP. | SLOPE | AMP. | SLOPE |
| LOCATION OF SAMPLING PULSE $(\omega_0 t)$ | 0 | 0 | +K | +K | 0 | 0 | K | +K | 0 | 0 | +K | +K | 0 |
| | $\pi$ | 0 | +K | −K | 0 | 0 | −K | −K | 0 | 0 | +K | +K | 0 |

FIG. 5.

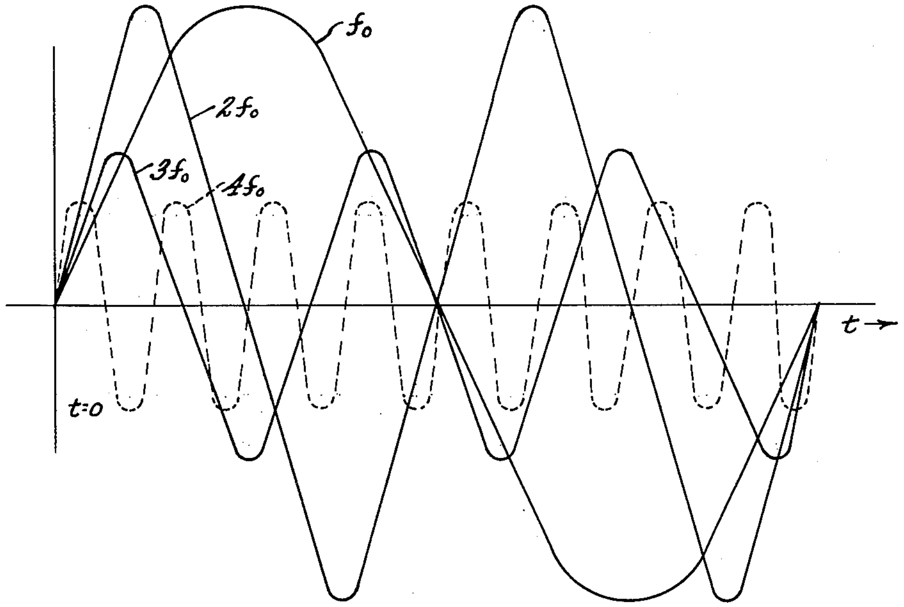

FIG. 6.

INVENTOR.
PHILIP J. HERBST
BY Morris [signature]
ATTORNEY

United States Patent Office 3,037,190

Patented May 29, 1962

3,037,190

INFORMATION TRANSMISSION SYSTEM

Philip J. Herbst, Moorestown, N.J., assignor to Radio Corporation of America, a corporation of Delaware Filed July 20, 1956, Ser. No. 599,253
12 Claims. (Cl. 340—170)

The present invention relates to information transmission systems, and more particularly to a novel system for the transmission of information that may be represented in digital form.

With the development and more extensive use of electronic computing equipment, there arises a need for a system for transmitting information directly in a form that is adapted to be handled by computers. Many computers, especially those of the more complex type, are designed to process data represented by digital codes, such as binary and other mark and space codes. An information transmission system provided by the present invention is suitable for directly transmitting information which may be represented by such codes.

Another important application for the present invention is in the field of signalling for remote control. Information in the nature of command data may be supplied in various forms to the control equipment associated with remotely controlled apparatus, such as vehicles or aircraft. It has been found desirable to supply command data by means of trains of electrical pulses arranged or formed in accordance with a digital code. The transmission of such information in digital form is convenient and desirable in that greater amounts of information can be supplied in shorter intervals. Moreover, electronic equipment capable of processing information in this form is accurate and reliable.

There are available some methods and systems for the transmission of digital information. For example, pulse-code modulation techniques have been utilized for the transmission of digital information. In accordance with pulse-code modulation techniques, a train of spaced pulses is used as a modulating wave. A pulse or a space in this wave signifies a unit of information that is transmitted. A pulse modulated carrier wave is then produced. The pulse carrier wave is demodulated at the receiver to reproduce the original pulse-coded modulating wave which represents the digital information transmitted.

Pulse-code modulation has been used for the transmission of digital information. However, it has not been altogether satisfactory. The bandwidth required for the transmission of a pulse-coded modulated wave is quite large so that the use of pulse-code modulation is usually restricted to very high transmission frequencies. A difficulty arising from the use of a wide frequency band is increased susceptibility to interference. Excessive noise may lead to loss of control over the remotely controlled apparatus. The interference susceptibility problem is not easily solved because of the random occurrence of noise. Consequently, a noise pulse may easily be mistaken for a signal pulse in the receiver.

Another well-known system for the transmission of digital information utilizes frequency shift keying. However, this system requires a wide band of frequencies and is susceptible to interference much the same as systems employing pulse-coded modulation techniques.

Consequently, it is an object of the present invention to provide a novel system for the transmission of information that may be represented in digital form, such as by means of mark and space codes.

It is a further object of the present invention to provide a signalling system adapted to have a novel mode of operation.

It is a still further object of the present invention to provide a novel telemetering system capable of high speeds of transmission and in which complexities are reduced and reliability is enhanced.

It is a still further object of the present invention to provide a novel information transmission system adaptable to use components which are less critical in frequency of operation than are used in the systems presently available.

It is a still further object of the present invention to provide an information transmission system for transmitting information represented in digital form which requires less bandwidth than other systems presently available.

It is a still further object of the present invention to provide an information transmission system capable of transmitting information represented by electrical impulses, which occur in accordance with a digital code, and which may be adapted to provide for decreased sensitivity to interference.

It is a still further object of the present invention to provide an information transmission system that is operative as an information translating system capable of being employed for the translation of information into a form different from the form in which it is supplied to the system; such translated form being more suitable for many information handling functions, such as the recording and storage of information.

Briefly, the present invention provides for the transmission of harmonically related waves, such as may include a fundamental or reference frequency wave together with a plurality of waves of frequencies, successive ones of which are successively higher harmonics of the reference frequency. Each of the harmonic frequency waves may represent a different digital location, or may provide a means for the transmission of successive units of digital information. Means are provided to selectively shift or displace the phase of any of the harmonic frequency waves by a discrete quantity which is desirably equal to one-quarter cycle as measured on the respective harmonic waves. The phase shift means may be operated in accordance with information supplied by an electronic computer or other apparatus which supplies information in the form of a dual condition code. By shifting the phase of a harmonic wave, a different binary digit is represented. Thus, a binary digit may be "0" or "1" depending upon whether the harmonic wave representing that digit is shifted in phase. As many harmonic waves may be used as there are information transmission channels or binary digits in a code, according to which the information is transmitted. All of the harmonic waves may be combined with the reference wave to provide a composite signal, which may be directly transmitted or may be used as a modulating wave to modulate a carrier signal. Thus, it will be seen that the digital information is translated into a different form by the system of the present invention. The harmonic waves may be recorded on a suitable medium, such as a magnetic record medium, individually or as a composite signal.

Should a composite signal or modulated carrier signal be used, it is first detected in a receiver which includes filter circuits for separating the reference wave and the various harmonic frequency waves. Since each wave is at a single frequency, it may be selected by a filter network, which may be of less critical design than those used in present telemetering systems for digital information.

In order to derive the transmitted digital information, each harmonic wave is sampled at given instants, which bear a relationship to the period and phase of the fundamental or reference frequency wave. For example, a sampling pulse is generated at the receiver that may be formed from or synchronized with the detected and separated reference wave. In the receiver, each of the harmonic waves is sampled by suitable means, such as gating circuits, at the instants when the reference wave crosses its alternating current axis. The amplitude or slope of each of the sampled harmonic waves will be dependent upon whether that harmonic wave has been shifted in phase. It has been found that there is a detectable difference between the amplitude of a sampled harmonic wave if that wave has undergone a shift in phase. For example, a binary digit, which is "0," may be indicated if the value of amplitude of a sampled harmonic wave is substantially zero; whereas, the other binary digit, which is "1," may be indicated if the sampled harmonic wave is of some value of amplitude. A similar relationship exists between the value of slope of sampled harmonic waves which have undergone selective phase shift in the transmitter. Output equipment of the information transmission system of the present invention may be provided with means that are responsive to the amplitude or slope of each of the sampled harmonic waves. This equipment may be connected directly to the input of a computer, printer, or other device for processing the transmitted information.

The above-mentioned and other objects and advantages of the present invention will, of course, become apparent and immediately suggest themselves to those skilled in the art to which the invention is directed from a reading of the following specification in connection with the accompanying drawings in which:

FIG. 5 is a table indicating the amplitude of the received harmonic waves at the instant they are sampled in receiving equipment incorporating the present invention; and FIG. 6 is a waveform diagram representing the relationship between the harmonic waves in the system illustrated in FIGS. 1 to 3.

Figure 1:
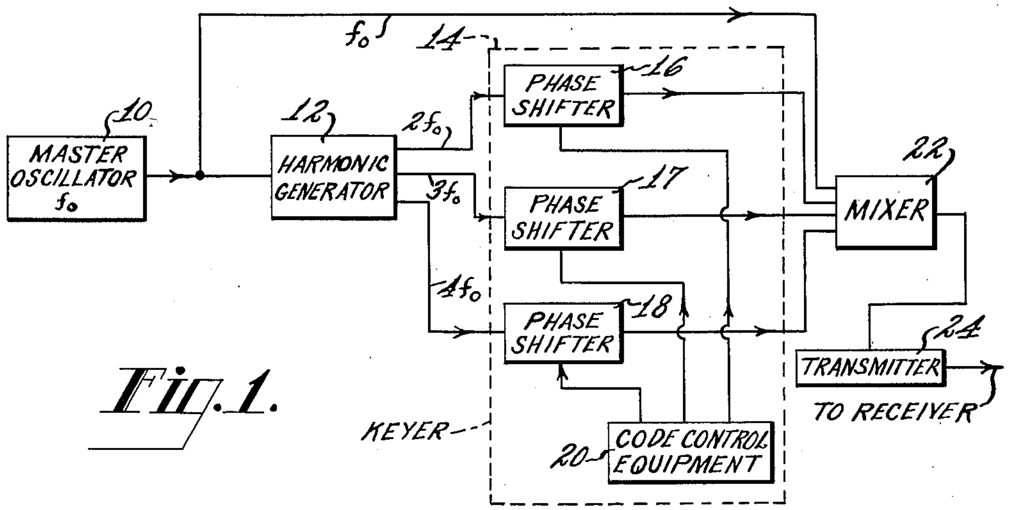
FIG. 1 is a schematic diagram of transmitting equipment of an information transmission system incorporating the present invention.

Referring to FIG. 1, signal transmitting equipment which operates in accordance with applicant's invention is shown. This equipment includes a master oscillator 10, which produces an alternating current wave of sinusoidal waveform at constant frequency. This frequency is indicated as being $f_0$. The master oscillator may be a conventional oscillator of the crystal controlled type.

The wave generated by the master oscillator will become the fundamental wave of a plurality of harmonically related waves. This fundamental wave and its harmonics provide a signal for transmitting digital information. The speed of transmission is a function of the frequency of the waves. The higher the frequency, $f_0$, the greater the speed at which digital information may be transmitted. A unit of digital information, it has been found, may be transmitted in the interval of one-half the period of the fundamental wave, which is produced by the master oscillator 10. Accordingly, it will be desirable to generate a fundamental wave of higher frequency in the event that higher speeds of information transmission are desired. For lower speeds of transmission, the frequency of oscillations generated by the master oscillator 10 may be considerably reduced. The highest frequency harmonic wave will then be at a comparably low frequency.

In order to generate the harmonic waves, a harmonic generator 12 may be used. This harmonic generator 12 can be of conventional design; for example, a non-linear element may be included therein to provide a signal rich in harmonics from the waves of reference frequency supplied by the master oscillator 10. Different tuned circuits, incorporated in the harmonic generator 12, may be used to separate the individual harmonic waves. Alternatively, an individual harmonic generator that is coupled to the master oscillator 10 may be used for developing each of the harmonic waves. These generators may be of the type using a non-linear element, as described above, or may be of the type utilizing frequency multiplier circuits. Different phase adjustment networks may be connected to the output of each of the harmonic generators for purposes of insuring that all of the harmonically related waves are properly phased. A suitable phase relationship for the harmonically related waves will be brought out in detail hereinafter.

Only three harmonic waves of frequencies $2f_0$, $3f_0$, and $4f_0$ are indicated in the drawing as being generated by the harmonic generator 12. In accordance with the invention, as many harmonic waves may be generated as there are positions in the digital code or channels over which digital information may be transmitted sequentially. Each harmonic wave may be used to transmit different units of digital information.

The harmonic waves are phased with respect to the reference wave to have a predetermined time relationship therewith. The relationship between the waves may be expressed mathematically. The instantaneous value of all of the harmonically related waves, including the reference wave, may be defined by the expression $$K \sin (n\omega_0 t+\theta)$$

wherein

K is a constant for any one of said waves and equal to the maximum alternating current amplitude thereof;

$n$ is an integer;

$\omega$ is the angular frequency of the fundamental or reference wave in radians per second;

$t$ is time in seconds; and $\theta$ is a phase angle in radians.

The phase angle $\theta$ for all of the harmonically related waves is made equal to zero to establish the predetermined time relationship of the harmonically related waves. The term $\omega_0$ is used to simplify the mathematical expression defined above. It will be appreciated, that $\omega_0$ is equal to $2\pi f_0$ in accordance with the relationships applicable to sinusoidal waves.

The time relationship of the harmonic waves with respect to the reference wave is also illustrated in FIG. 6, wherein several harmonically related sinusoidal waves are represented by their waveforms. The harmonically related waves are indicated in FIG. 6 as being of different amplitudes for purposes of clearly indicating the individual waves. It will be appreciated, that the waves may be of equal amplitude. Although, waves of equal amplitude are desirably employed in practicing the present invention, the transmission of digital information may be accomplished, in accordance with the invention, with waves of different amplitudes.

It is observed from the waves illustrated in FIG. 6 that they are phased so that like recurrent values of each of the waves occur at predetermined intervals. The value of the fundamental wave, $f_0$, is zero at an instant that the values of each of the other harmonic waves are zero. This value of the fundamental wave is recurrent in that it occurs during every cycle of the reference wave. This recurrent value is indicated in FIG. 6 as being at the point on each wave that crosses the alternating current axis as the wave is changing in polarity in the positive sense.

The time relationship between the harmonically related waves is important since it is determinative of the location of the digital information on the harmonic waves. It may, therefore, be desirable, as mentioned above, to include phase compensating circuits in the harmonic generator 12 in order to insure that the harmonic waves are properly phased with respect to the reference wave.

The digital information is imposed on the harmonic waves in a keyer 14 which includes the apparatus within the dashed lines on FIG. 1 of the drawing. Phase shifters 16, 17, and 18 are connected to receive the individual harmonic waves from the output of the harmonic generator 12. The phase shifters 16, 17, and 18 are utilized to insert a discrete quantity of phase shift into each of the harmonic waves. This phase shift may be inserted substantially instantaneously; for example, for a brief interval less than one-half the period of the reference wave.

Since each of the harmonic waves may be displaced in phase by a discrete quantity, a delay line adapted to operate at the frequency of the harmonic wave may be included in each of the phase shifters 16 to 18. Accordingly, the phase shifters may be of conventional design. However, they are controlled in accordance with the invention to impose a phase displacement in accordance with the particular unit of digital information to be transmitted.

Since the harmonic waves that are apt to be displaced in phase are at successively higher frequencies, $2f_0$, $3f_0$, and $4f_0$, respectively, the delay lines associated with the phase shifters 16 to 18 are designed to impose successively smaller amounts of delay. It may be found that an imposed phase shift of one-quarter cycle of the harmonic wave provides for best results in transmission and reception of digital information. Accordingly, each of the phase shifters may be designed to impose a phase shift of one-quarter cycle, 90°, on the wave applied thereto.

The phase shifters 16, 17, and 18 are arranged to operate in accordance with a binary-code. Code control equipment 20, which may be the output equipment of a computer and which ordinarily processes information expressed in binary form, may be utilized to control the operation of the phase shifters 16 to 18. It is possible that the output equipment may be available part of the usual output equipment of the computer. The need for additional apparatus to transmit the information from the output of a computer would then be unnecessary.

Any one of the phase shifters 16 to 18 may be arranged to introduce a discrete phase displacement when a binary digit of one type is manifested in that portion of the equipment 20 which controls it. The code control equipment may comprise a series of "flip-flops." An individual flip-flop may control an individual one of the phase shifters 16, 17, or 18. When the controlling flip-flop is operating in one of its two states of operation, the controlled phase shifter is arranged to impose a discrete phase displacement upon the harmonic wave transmitted therethrough. In the other state of operation of the flip-flop, the phase shifter is arranged not to impose any phase shift on the transmitted harmonic wave. A binary digit of one type may be represented by one state of the flip-flop and a binary digit of the other type may be represented by the other state of operation of the flip-flop. Accordingly, a phase shift is imposed only in response to one type of binary digit. The absence of phase shift in the transmitted harmonic wave is indicative of the other type of binary digit. With proper control, the output equipment can be arranged to transmit a complete binary number or any item of information that may be represented in accordance with binary notation. Thus, any information representable in digital form may be transmitted.

It will be seen that these binary numbers may be transmitted simultaneously by means of simultaneous selective phase displacements of selected ones of the harmonic waves. The binary numbers and the transmitted information consisting of a group of binary numbers may be transmitted sequentially on each of the harmonic waves, if desired.

Several arrangements for providing discrete and instantaneous phase displacements by the cooperation of the phase shifters with the control equipment will be suitable as will be apparent to one skilled in the art. For example, relays to provide a conductive shunt around the delay lines in the phase shifters 16 to 18 may be used. The relays may be controlled by the code control equipment 20. An electronic switch may be utilized instead of a mechanical relay for higher speed operation.

A mixer circuit 22 is provided. The reference wave of frequency $f_0$ and the harmonic waves transmitted through the phase shifters 16, 17, and 18 are applied to the mixer circuit 22. It may be desirable to connect resistors between each of the phase shifters 16 to 18 and the mixer 22, and between the master oscillator 10 and the mixer 22. This mixer circuit may be an additive mixer, such for example as a resistive network, which provides a composite signal consisting of the additively combined harmonically related waves. This composite signal may be used as a modulating wave for a radio transmitter 24. By means of a radio transmitter 24, the information may be transmitted over long distances. Alternatively, the composite signal may be applied directly to the telephone lines or to a cable which is connected to the remotely located equipment wherein the information is to be received or utilized. Although a mixer 22 is shown, it is possible to transmit the harmonically related waves independently. The receiving equipment may be designed to utilize the independently transmitted harmonically related waves. It is noted that the reference frequency wave is transmitted together with the harmonic waves. The reference frequency wave is used as a time reference for controlling the receiving equipment for deriving the transmitted information from the harmonic waves.

Figure 2:
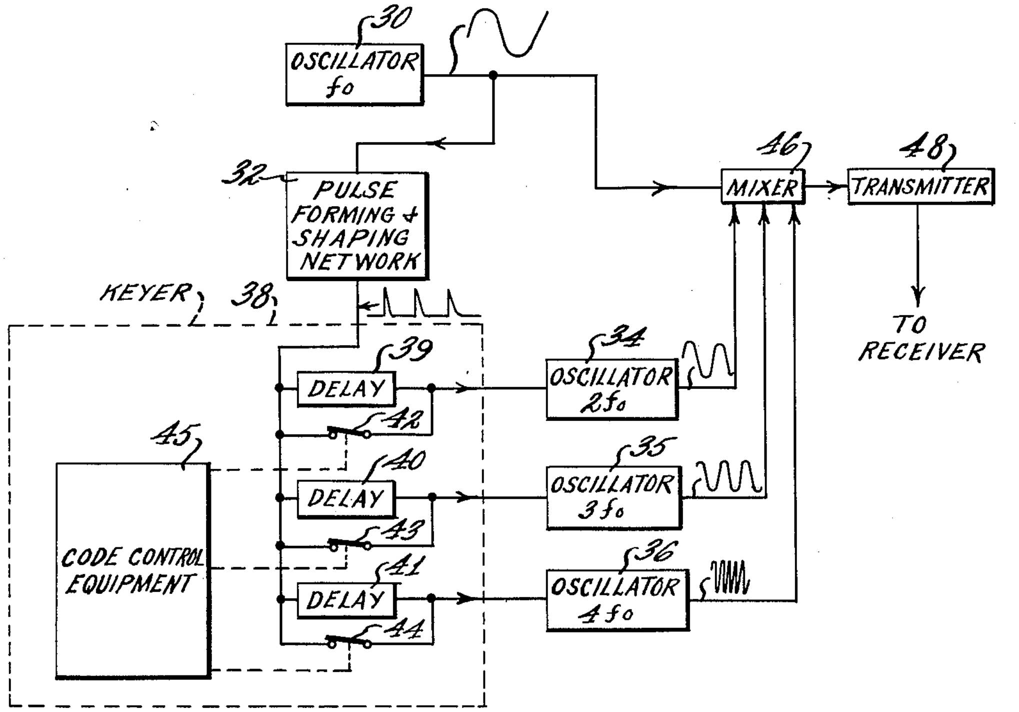
FIG. 2 is a schematic diagram of another embodiment of transmitting equipment of an information transmission system incorporating the present invention.

Modified transmitting equipment in which the harmonically related waves, which are adapted to carry the digital information, are generated by somewhat different means is shown in FIG. 2. In the transmitting equipment of FIG. 2, an alternative arrangement is used to establish the predetermined time relationship between the harmonically related waves. This arrangement permits the generation of harmonic waves that are displaced in phase instead of subsequently displacing harmonic waves previously provided. An oscillator 30 which may be similar to the master oscillator 10 of FIG. 1 generates the reference frequency or fundamental alternating current wave of sinusoidal waveform and constant frequency $f_0$. This wave is applied to a pulse forming and shaping network 32.

The pulse forming and shaping network 32 generates a positive pulse at the instant the fundamental wave crosses its alternating current axis. Thus, repetitive pulses of like polarity are generated which are separated by intervals of duration equal to one-half the period of the fundamental wave. These pulses are very narrow in width and occur substantially at the instant that the fundamental wave crosses its alternating current axis. The pulse forming and shaping network 32 may be constructed in accordance with well-known pulse shaping techniques so as to provide desired pulses, which are represented by the waveform located next to the output of the network 32 on the drawing. A suitable network 32 may include multivibrators that are synchronized with the fundamental wave and differentiating circuits for producing sharp voltage pulses from the sides of square waves generated by the multivibrators. Alternatively, the network 32 may be of the type described in detail in connection with the receiving equipment hereinafter.

The pulses generated by the pulse forming and shaping network 32 will be used to synchronize oscillators 34, 35, and 36, since the oscillators 34, 35, and 36 are synchronized by pulses provided by the network 32. The harmonic waves produced by these oscillators are phased with respect to the reference wave to establish the predetermined time relationship mentioned above in connection with FIG. 1.

In order to provide for substantially instantaneous phase shift of the harmonic waves generated by the oscillators 34, 35, and 36, a keyer 38, shown in the drawing as being included within the dashed lines, is connected between the oscillators 34, 35, and 36 and the pulse forming and shaping network 32. This keyer is designed to selectively delay the pulses which pass from the pulse forming and shaping network 32 to the individual oscillators 34, 35, and 36. Since each of the pulses which synchronize each of the oscillators 34 to 36 is subject to a discrete time delay, the phase of the waves generated by the respective oscillators will be delayed.

The keyer 38 includes delay networks 39, 40, and 41, each of these delay networks may be a delay line which is adapted to delay a pulse of the type generated by the pulse forming and shaping network. Delay networks of this type are well-known and will not be described in detail herein. The input terminal of each of the delay lines 39 to 41 is connected to the output of the pulse forming and shaping network 32. The output of the delay line 39 is connected to the input of the oscillator 34. The output of the delay line 40 is connected to the input of the oscillator 34. The output of the delay line 41 is connected to the input of the oscillator 36. Each delay line is designed to impose a delay equal in time to less than one-half of the period of the harmonic wave produced by the oscillator to which it is connected. Since it is desirable to shift the phase of each of the harmonic waves by a like quantity, such as one-quarter period (90°), the delay imposed by the delay line 39 which is connected to the oscillator generating the lowest of the harmonic frequencies will be larger than the delay imposed by the delay line 40, and still larger than the delay line imposed by the delay line 41.

It will be remembered that a binary digit of one type is represented by a phase displacement, whereas a binary digit of the other type is represented by the absence of the phase displacement. Consequently, the delay lines 39, 40, 41 are shunted by switches 42, 43, and 44, respectively. These switches are shown as being normally closed so that no delay is imposed by the delay networks 39, 40, and 41 in the absence of an instruction from the code control equipment 45 which is part of the keyer 38. The switches 42, 43, and 44 may be elements of relays associated with the code control equipment 45. Thus, when the relays are energized in accordance with the binary code, the switches 42, 43, and 44 are selectively opened in accordance with the code. Electronic components providing a switching function, such as gating tubes, which are controlled by the output equipment, may be substituted for the mechanical switches indicated in the drawing; the mechanical switches 42, 43, and 44, being shown for simplicity of illustration.

The harmonic waves from the outputs of the oscillators 34, 35, and 36 may be combined in a mixer circuit 46 to produce a composite signal for transmission to the receiver. This signal may be applied to a transmitter 48 for wireless transmission to the remotely controlled receiving equipment. The mixer 46 and the transmitter 48 are similar to their counterparts in FIG. 1.

It may be observed that the digital information, which appears in the form of a mark and space or pulse coded signal in the code control equipment of the keyer of the transmitting equipments of FIGS. 1 and 2, is effectively translated into a signal of a sinusoidal nature. The individual signals supplied to the mixer or the composite signal output of the mixer is a translation of the digital signal input to the system. The individual or composite signal may be found more adaptable for information storage, as well as for signalling. Magnetic record mediums, such as those in the form of magnetic tape, have been found highly suitable for the storage of information. Thus, it will be appreciated that storage of digital information translated into sinusoidal signals in accordance with this invention may be accomplished with conventional techniques more readily than is the case with pulse signal representations of digital information.

Figure 3:
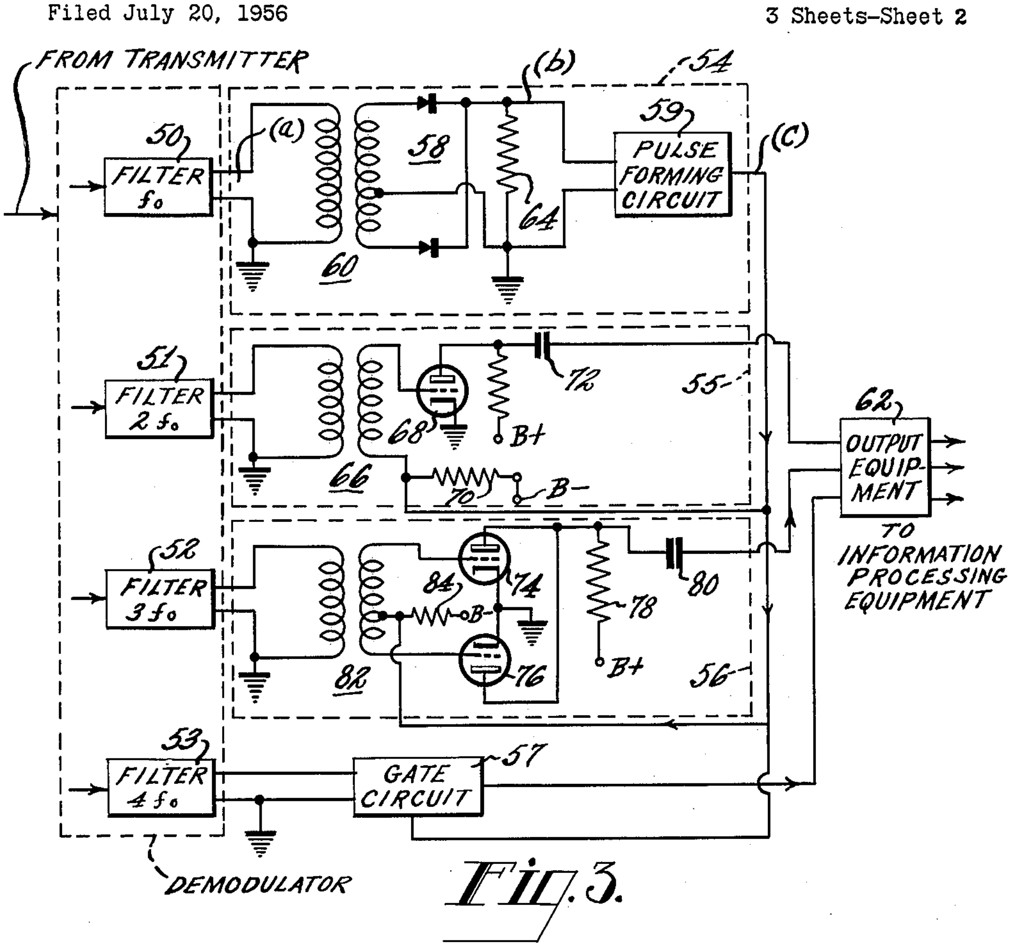
FIG. 3 is a schematic diagram of receiving equipment of an information transmission system incorporating the present invention.

FIG. 3 schematically represents receiving equipment designed in accordance with the present invention. The signal sent out by the transmitter 24 or 48 (FIGS. 1 and 2) is received and demodulated in a demodulator which is schematically shown as being enclosed within by the dashed lines. This demodulator may contain conventional radio apparatus for demodulating the composite signal transmitted by the radio trnasmitters 24 or 48 in the transmitting apparatus described above. The demodulator also contains a plurality of filter networks 50 to 53 for separating the various harmonically related waves. The filter network 50 is provided for deriving the fundamental or reference wave of frequency $f_0$ and filter networks 51, 52 and 53 are provided for separating the successive harmonic waves of frequencies, $2f_0$, $3f_0$, *and* $4f_0$, respectively.

These filter networks 50 to 53 need only pass a single frequency. Consequently, the design of such filters can be much simplified. It will be remembered that known systems for transmitting digital information require critical and expensive bandpass filters for their successful operation.

Figure 4:
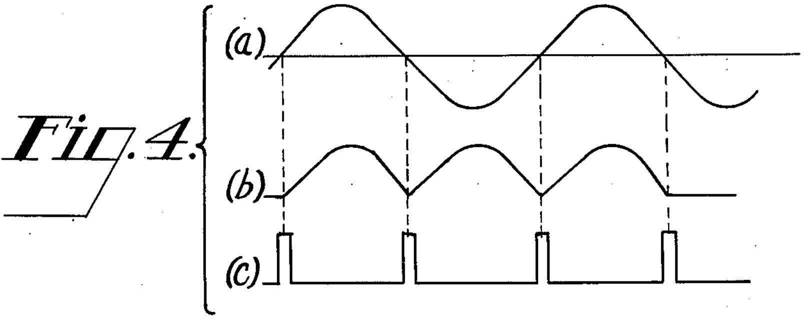
FIG. 4 shows representations of waveforms which occur in the equipment of FIG. 3.

The output of the filter 50, which separates the reference wave, is connected to a sampling pulse forming circuit 54. This sampling pulse forming circuit may be similar to the pulse forming and shaping network 32 described in connection with FIG. 2. This circuit 54 includes a transformer 60 forming the input of a full-wave rectifier circuit 58. The load resistor 64 of the rectifier circuit 58 is connected to a pulse forming circuit 59. The latter circuit 59 may be designed in accordance with usual pulse circuitry techniques to shape the output wave of the rectifier circuit 58 or it may be a pulse generator, such as a multivibrator, that is controlled or synchronized thereby. The output signal from the filter 50, represented by the waveform (*a*) of FIG. 4, is a sinusoidal wave at the fundamental frequency $f_0$. This wave is rectified to provide an output wave, as represented by waveform (*b*) of FIG. 4. It may be observed by the negative peaks of the wave occur at the half-wave points; that is at the instants when the reference wave crosses its alternating current axis. The pulse forming circuit may amplify, invert, and clip the rectifier output wave such that sampling pulses of required shape are formed. The waveform of the sampling pulses is represented by the waveform (*c*) of FIG. 4.

The sampling pulse forming circuit 54 is designed to provide sharp pulses of like polarity at the instant the value of the fundamental wave is zero; that is, at the instant when this wave crosses its alternating current axis. It will be observed that the impulses, therefore, occur at intervals of one-half period of the fundamental wave. The fundamental wave may be defined mathematically by the expression $$K \sin \omega_0 t$$

Consequently, at the instants of time represented by $t$, at which the value of the expression is equal to zero, a sampling pulse will be produced by the sampling pulse forming circuit 54. These instants will be when the expression $\omega_0 t$ equals 0 and $\pi$, respectively.

Inspection of the chart illustrated in FIG. 5 of the drawings will indicate that the transmitted digital information can be derived by sampling each of the harmonic waves at the instants when the expression $\omega_0 t=0$ and $\pi$, respectively, and by providing means responsive to the amplitude or slope of each of the sampled waves. Thus, it may be seen that the value of amplitude of each of the sampled harmonic waves is equal to zero if the waves have not been shifted in phase at the transmitter. The value of amplitude of the even harmonic waves ($2f_0$, $4f_0$, . . . ) is equal to a positive quantity, when sampled, if these waves have been subjected to phase shift. On the other hand, the value of amplitude of successive odd harmonic waves ($3f_0$, $5f_0$, . . . ) which have been phase shifted is a positive quantity when sampled at the instants that $\omega_0 t=0$, but will be, alternately, a negative and a positive quantity when sampled at the instant that $\omega_0 t=\pi$. The values of slope of the harmonic waves when sampled are related to phase shift in the same manner as the values of amplitude, but in an opposite sense, as indicated on the chart of FIG. 5. Summarizing the above, it may be seen from the chart of FIG. 5 that the harmonic waves subjected to phase shift, when sampled, have values of amplitude equal to a discrete quantity, $\pm K$, whereas, the harmonic waves which have not been subjected to phase shift have zero amplitude when sampled.

The outputs of the filters 51, 52, 53 which separate the different harmonic waves are individually connected to the input of gate circuits 55, 56, and 57, respectively, which function to sample the harmonic waves at the proper instants. The sampling pulses are also applied to the gate circuits 55 to 57. The gate circuits are adapted to transmit a sample of the harmonic wave applied thereto at the instant that a sampling pulse is applied from the sampling pulse forming circuit 54.

The polarity of the transmitted samples of the harmonic waves will be the same so as to permit the use of simplified circuitry in the output equipment following the gate circuits 55 to 57.

The gate circuit 55, which is connected to the filter 51 that selects the second harmonic wave of frequency $2f_0$, may be similar to the gate circuit 57 since both are adapted to sample even harmonic waves having like characteristics, as discussed above. The harmonic wave is applied to the primary of a transformer 66. The secondary of the transformer is connected to the grid of a tube 68 at one end thereof. The other end of the transformer secondary is connected through a resistor 70 to a source of negative voltage indicated schematically at B−. The negative voltage is of sufficient magnitude to keep the tube in a non-conductive state until a sampling pulse is applied. The sampling pulse voltage is applied across the resistor 70. The tube 68 is conductive for the duration of the sampling pulse. Since the value of amplitude of the harmonic wave at the instant of sampling will be a positive quantity if phase shift was applied thereto at the transmitter, a negative impulse is transmitted through the coupling capacitor 72 upon sampling. However, the absence of phase shift results in the transmission of no such impulse since the harmonic wave is of substantially zero amplitude when sampled.

The gate circuit 56 that is connected to the filter 52 which selects the third harmonic wave is somewhat different since that circuit must be adopted to transmit a negative impulse at the times when the sampled harmonic wave may have a value of amplitude that is a negative quantity. To achieve the desired operation, the gate circuit 56 incorporates a pair of tubes 74 and 76 which have their cathodes connected together to a common voltage reference point, such as ground. The plates of the tubes are also connected to a common output circuit including a load resistor 78 and a coupling capacitor 80. The filter 52 is coupled to a transformer 82. The opposite ends of the transformer secondary are connected to the grids of the tubes 74 and 76, respectively. Both tubes 74 and 76 are biased to cut-off by connection of a source of negative voltage, illustratively designated at B−, to the center-tap of the transformer secondary through a resistor 84. The sampling pulses are applied to the center-tap. The amplitude of the sampling pulse, bias, and operating voltages are selected so that only the one of the tubes 74 or 76 to which a harmonic wave of positive polarity is applied will condut. Thus, either a negative impulse or no impulse will be transmitted through the coupling capacitor 80 when the harmonic wave is sampled.

The gate circuits 55, 56 and 57 are each connected to output equipment 62 which may include amplifiers and pulse shaping networks. When the slope of the sampled wave is to be detected, a differentiating circuit can be connected following each of the gate circuits. The output equipment 62 may be connected to other equipment for processing the derived digital information. The equipment for processing the digital information may be part of a digital computer, printer, or other device for indicating or using the digital information. Thus, it will be observed that the present invention provides the means for the direct utilization of the digital information.

Other means will suggest themselves for receiving and deriving the digital information as transmitted in the form of selectively phase displaced, harmonically related waves. For example, other circuits may be provided for obtaining a pulse from each harmonic wave at the instants that each wave crosses its alternating current axis in a like manner to which the sampling pulse is obtained. The pulses so obtained can be individually compared with the sampling pulse. On comparison, the simultaneous occurrence of the impulse derived from the harmonic wave and the sampling pulse will be indicative of a unit of digital information of one type, whereas, a unit of digital information of the other type will be indicated when the pulses do not occur simultaneously.

Phase displacements of $\pi/2$ radians or 90° are applied to the individual harmonic waves in the transmitter. It is desirable to displace the harmonic signals in phase by a quantity equal to $\pi/2$ radians. This is in order to obtain a maximum amplitude or maximum slope for the transmitted samples of the harmonic waves. However, any phase shift or displacement less than one-half cycle of the harmonic waves will provide a detectable value of amplitude or slope; whereas, a harmonic wave sampled in accordance with the principle of the present invention, will exhibit substantially zero value when subjected to no phase shift.

What is claimed is:

1. An information transmission system comprising means for generating a plurality of harmonically related waves, the lowest frequency one of said waves being a reference wave and the others of said waves having a given phase relationship with respect to said reference wave, means for selectively and individually shifting the phase of said others of said waves respectively by discrete quantities in accordance with information inputs to said system, and means for deriving said input information from said system responsive to the phase relationship between said reference wave and each of said others of said waves existing at periodic intervals timed by said reference wave.

2. An information transmission system comprising means for generating a plurality of harmonically related waves, the lowest frequency one of said waves being a reference wave and the others of said waves having a given phase relationship with respect to said reference wave, means for selectively and individually shifting the phase of said others of said waves respectively by discrete quantities which are equal when measured in terms of each of said waves in accordance with input information to said system, and means controlled by said reference wave responsive to the instantaneous amplitude of each of said others of said waves for directly deriving said input information from said system.

3. A system for transmitting information in digital form comprising means for providing a plurality of harmonically related alternating current waves, the one of said waves which is lowest in frequency being a reference wave, the others of said waves being phased with respect to said reference wave to establish a predetermined time relationship therewith, means responsive to said digital information cooperating individually with said others of said waves for providing a signal representative of said digital information, and means for receiving said signal to derive said digital information therefrom, said receiving means including means for detecting each of the others of said waves at recurrent intervals of duration determined by the period and the phase of said reference wave.

4. A system for transmitting information in digital form comprising means for providing a plurality of harmonically related alternating current waves, the one of said waves which is lowest in frequency being a reference wave, the others of said waves being phased with respect to said reference wave to establish a predetermined time relationship therewith, means responsive to said digital information cooperating with said others of said waves for providing a signal representative of said digital information, said signal including said reference frequency wave, and means for receiving said signal to derive said digital information therefrom, said receiving means including means responsive to said reference frequency wave for detecting each of said others of said waves at recurrent intervals of duration determined by the period and the phase of said reference wave.

5. An information transmission system for transmitting information in the form of binary digits, said system comprising means for transmitting a signal representing said information, said transmitting means comprising means for providing a plurality of harmonically related alternating current waves which bear a fixed time relationship to each other, said lowest and fundamental frequency one of said waves and said high frequency ones of said waves cooperating to provide a signal adaptable to represent information in the form of binary digits, means for instantaneously displacing in phase the different ones of said higher frequency waves in accordance with the kind of binary digit being transmitted, a binary digit of one kind being represented by an instantaneous displacement in phase of a higher frequency wave, binary digits of the other kind being represented by an absence of instantaneous phase displacement of a higher frequency wave, means for receiving said transmitted signal, said last named means comprising means controlled by the one of said harmonically related waves of fundamental frequency for sampling each of said higher harmonic frequency waves at intervals determined by the period of said fundamental frequency wave, and means responsive to said sampled portions of said higher harmonic frequency waves for providing signals representative of the transmitted binary digits therefrom.

6. An information transmission system for transmitting information in accordance with a binary code comprising means for generating a plurality of harmonically related alternating-current waves of sinusoidal waveform, the lowest frequency one of said waves being a reference wave, the higher frequency ones of said waves being phased with respect to said reference wave such that like recurrent values thereof occur at predetermined intervals, means for selectively and instantaneously displacing in phase individual ones of said higher frequency waves in accordance with said binary code, individual ones of said higher frequency waves being instantaneously displaced in phase by a discrete portion of the cycle thereof in response to a binary digit of one kind, the absence of phase displacement being indicative of a binary unit of the other kind, means for transmitting a signal including said reference wave and said higher frequency waves, said higher frequency waves of said signal being derived from the output of said phase displacement means, means for receiving said signal for deriving said binary coded information, said receiving means comprising circuits for selectively transmitting samples of said higher frequency waves, and means responsive to said reference wave for controlling said circuits to transmit said samples at predetermined times separated by periodically recurrent intervals of predetermined duration whereby said transmitted samples are indicative of said binary coded information.

7. An information transmission system for transmitting information in accordance with a binary code comprising an oscillator for providing a reference frequency wave, means utilizing the output of said oscillator for generating a plurality of alternating-current waves which are successive harmonics of said reference wave, said harmonic waves being phased with respect to said reference wave such that like recurrent values of each of said waves occur at predetermined intervals, keying means for selectively and instantaneously displacing in phase individual ones of said harmonic waves in accordance with said binary code, an individual one of said higher frequency waves being instantaneously displaced in phase by a discrete portion of the cycle thereof in response to a binary digit of one kind whereby the absence of phase displacement is indicative of a binary unit of the other kind, and means for transmitting a signal including said reference wave and said harmonic waves, said signal representing said binary coded information, means for receiving said signal for deriving said binary coded information therefrom, said receiving means comprising gating circuits, each of said gating circuits being adapted to transmit selected samples of different ones of said harmonic waves, means responsive to said reference wave for controlling said gating circuits whereby said gating circuits sample said harmonic waves at predetermined periodically recurrent intervals, and means responsive to said transmitted samples for providing said binary coded information.

8. An information transmission system in accordance with claim 7 wherein said means for transmitting a signal including said reference wave and said harmonic waves is a mixing circuit for combining all of said waves into a composite signal, and wherein said receiving means includes a plurality of filter circuits, each of said filter circuits being designed to select only waves of the frequency of one of said harmonic waves whereby said reference wave and said higher frequency waves are separated.

9. An information transmission system for transmitting information in accordance with a binary code comprising means for generating a plurality of harmonically related alternating-current waves of sinusoidal waveform, the lowest frequency one of said waves being a reference wave, the higher frequency ones of said waves being phased with respect to said reference wave such that all of said waves simultaneously cross the alternating current axis thereof when changing in polarity in a like sense, keying means for selectively and instantaneously displacing in phase individual ones of said higher frequency waves in accordance with said binary code, an individual one of said higher frequency waves being instantaneously displaced in phase by a discrete quantity less than one-half of the cycle thereof in response to a binary digit of one kind whereby the absence of phase displacement is indicative of a binary unit of the other kind, and means for transmitting a signal including said reference waves and said higher frequency waves from the output of said keying means, said signal representing said binary coded information, means for receiving said signal for deriving said binary coded information therefrom, said receiving means comprising gating circuits for sampling each of said higher frequency waves at any given instant, means responsive to said reference wave for controlling said gating circuits to transmit said samples at the instant said reference wave crosses the alternating current axis thereof, and output means responsive to said sampled portions of said higher frequency waves for providing said binary coded information.

10. An information transmission system for transmitting digital information in accordance with a binary code comprising means for generating harmonically related waves, the instantaneous value of said waves being defined by the expression $$K \sin (n\omega_0 t+\theta)$$

wherein

K is a constant for any one of said waves,
$n$ is an integer,
$\omega_0$ is the angular frequency of the fundamental of said harmonically related waves in radians per second,
$t$ is time in seconds, and
$\theta$ is a phase angle in radians;

all of said waves being phased so that $\theta$ is equal to zero, means providing an output signal representing said digital information, said last-named means including means for selectively and instantaneously displacing the phase of individual ones of said harmonically related waves by an angle $\theta$ equal to less than $\pi$ radians in accordance with said binary code, a binary digit of one kind being represented by an instantaneous displacement in phase, a binary digit of the other kind being represented by an absence of phase displacement, and means for receiving said output signal, said receiving means including circuit means responsive to samples of each of said harmonic waves selected at the instants of time at which the expression $$K \sin \omega_0 t=\theta$$

is satisfied, said last named-means providing said digital information.

11. An information transmission system for transmitting information in accordance with a binary code comprising means for generating harmonically related waves, the instantaneous value of said waves being defined by the expression $$K \sin (n\omega_0 t+\theta)$$

wherein

K is a constant for any one of said waves,
$n$ is an integer,
$\omega_0$ is the angular frequency of the fundamental of said harmonically related wave in radians per second,
$t$ is time in seconds, and
$\theta$ is a phase angle in radians;

all of said waves being phased so that $\theta$ is equal to zero, means for selectively and instantaneously displacing the phase of the individual ones of the said harmonically related waves other than said fundamental wave by an angle $\theta$ equal to less than $\pi$ radians in accordance with said binary code, a binary digit of one kind being represented by said phase displacement, a binary digit of the other kind being represented by an absence of phase displacement, means for transmitting an output signal, said signal including said fundamental wave and said other of said harmonically related waves from the output of said phase displacement means, means for receiving said output signal, said receiving means including circuit means for sampling each of said harmonic waves, said circuit means being controlled by said fundamental wave to transmit said samples at each instant the expression $$K \sin (\omega_0 t)$$

is equal to zero, and means responsive to said transmitted samples for providing said binary coded information.

12. An information transmission system for transmitting digital information comprising means for generating harmonically related waves, the instantaneous value of said waves being defined by the expression $$K \sin (n\omega_0 t+\theta)$$

wherein

K is a constant for any one of said waves,
$n$ is an integer,
$\omega_0$ is the angular frequency of the fundamental wave of said harmonically related waves in radians per second,
$t$ is time in seconds, and
$\theta$ is a phase angle in radians;

all of said waves being initially phased so that said phase angle $\theta$ for all of said waves is equal to zero, the fundamental wave of said harmonically related waves being a reference wave, means for selectively and instantaneously displacing the phase of the individual ones of the other of said harmonically related waves by an angle $\theta$ equal to $\pi/2$ radians in accordance with the kind of unit of digital information being transmitted by the selected one of said waves, a binary digit of one kind being represented by an instantaneous displacement in phase, a binary digit of the other kind being represented by an absence of phase displacement, means for transmitting an output signal, said signal including said fundamental wave and said other harmonically related waves from the output of said phase displacement means, means for receiving said output signal, said receiving means including a plurality of gating circuits for transmitting selected samples of each of said harmonically related waves, means responsive to said fundamental wave for generating sampling pulses at each instant the value of said fundamental wave is equal to zero, said instants being expressed by the equation $$K \sin (\omega_0 t)=0$$

means for applying said sampling pulses to said gating circuits whereby a sample of each of said other harmonically related waves is transmitted at predetermined intervals, and means responsive to the value of amplitude of each of said samples for detecting said transmitted binary units of digital information.

References Cited in the file of this patent

UNITED STATES PATENTS

| | | |
|---|---|---|
| 1,928,093 | Coyle | Sept. 26, 1933 |
| 2,007,809 | Nicolson | July 19, 1935 |
| 2,213,941 | Peterson | Sept. 3, 1940 |
| 2,236,374 | Marrison | Mar. 25, 1941 |
| 2,402,973 | Moore | July 2, 1946 |
| 2,483,718 | Aiken | Oct. 4, 1949 |
| 2,526,425 | Schulteis | Oct. 17, 1950 |
| 2,541,076 | Labin et al. | Feb. 13, 1951 |
| 2,542,627 | Chavallier | Feb. 20, 1951 |
| 2,562,682 | Schmitt | July 31, 1951 |
| 2,700,149 | Stove | Jan. 18, 1955 |
| 2,760,132 | Pawley | Aug. 21, 1956 |
| 2,824,172 | Cherry | Feb. 18, 1958 |

FOREIGN PATENTS

| | | |
|---|---|---|
| 860,230 | Germany | Dec. 18, 1952 |
| 1,111,747 | France | Sept. 27, 1954 |
| 717,075 | Great Britain | Oct. 20, 1954 |